United States Patent [19]

McGill et al.

[11] Patent Number: 4,601,891

[45] Date of Patent: Jul. 22, 1986

[54] PRODUCTION OF GRANULAR AMMONIUM POLYPHOSPHATE FROM WET-PROCESS PHOSPHORIC ACID

[75] Inventors: Kenneth E. McGill, Sheffield; Johnny R. Gamble, Florence, both of Ala.

[73] Assignee: Tennessee Valley Authority, Muscle Shoals, Ala.

[21] Appl. No.: 787,823

[22] Filed: Oct. 15, 1985

[51] Int. Cl.$^4$ .................... C01B 15/16; C01B 25/26
[52] U.S. Cl. .................... 423/305; 71/34; 71/43; 423/315
[58] Field of Search .................... 71/34, 43; 423/305, 423/315

[56] References Cited

U.S. PATENT DOCUMENTS

| | | | |
|---|---|---|---|
| 3,397,036 | 8/1968 | Narins et al. | 423/305 |
| 3,733,191 | 5/1973 | Meline et al. | 423/305 |
| 3,947,261 | 3/1976 | Sale et al. | 71/34 |
| 3,949,058 | 4/1976 | Young et al. | 423/305 |
| 3,988,140 | 10/1976 | Burns et al. | 423/315 |
| 4,011,300 | 3/1977 | Harbolt et al. | 423/305 |
| 4,041,133 | 8/1977 | Young | 423/305 |
| 4,104,362 | 8/1978 | Hahn et al. | 423/315 |
| 4,211,546 | 7/1980 | Jensen | 71/34 |
| 4,237,106 | 12/1980 | Hicks et al. | 423/305 |
| 4,246,248 | 1/1981 | McGill et al. | 423/305 |
| 4,334,907 | 6/1982 | Ellis et al. | 71/34 |
| 4,427,432 | 1/1984 | Mann, Jr. et al. | 423/305 |
| 4,427,433 | 1/1984 | Parker et al. | 423/305 |

Primary Examiner—John Doll
Assistant Examiner—Wayne A. Langel
Attorney, Agent, or Firm—Robert A. Petrusek

[57] ABSTRACT

An improved process for the production of granular ammonium polyphosphate fertilizer of a nominal 11-56-0 grade resulting from the pressure ammoniation of phosphoric acid without the use of a preneutralizer and using a specially designed pipe reactor to effect coating and granulation of an anhydrous melt onto cascading granules of ammonium polyphosphate with polyphosphate contents thereof ranging from about 15 percent to 30 percent of the total $P_2O_5$. The instant invention defines the operating parameters which allow for the practice of a process wherein there is essentially no degradation in the amount of $P_2O_5$ values produced as polyphosphate in the melt as said melt is further processed in the remaining steps therein through the step of product recovery, i.e., we have discovered the parameters for operating a process wherein essentially no hydrolysis of the polyphosphate $P_2O_5$ values in the melt occurs. In addition, because of the low moisture content of the melt as produced and provisions for the removal of that remaining in said melt as it is processed in the granulator, the requirement for the dryer that is normally required and used in most conventional processes is eliminated. The product is physically and chemically structured so that it is harder than similar grade granules made in accordance with the dictates and teachings of conventional processes. The product resulting from practice of the instant invention contains more polyphosphate than similar products made by ammoniation of wet-process orthophosphoric acids. The high quality product resulting from the practice of the preferred embodiments of the instant invention is dust-free, not agglomerated, and well suited for direct use in bulk blends or as starting materials for the production of high-quality suspension fertilizers.

4 Claims, 4 Drawing Figures

PRODUCTION OF GRANULAR AMMONIUM POLYPHOSPHATE FROM WET-PROCESS PHOSPHORIC ACID

The invention herein described may be manufactured and used by or for the U.S. Government for governmental purposes without the payment to us of any royalty thereof.

The present invention relates to an improvement in the production of fertilizer produced by reacting orthophosphoric acid of the so called wet process and ammonia; and more particularly, the present invention relates to an improved process for production of a superior granular fertilizer produced by pressure ammoniation of such wet-process acid coupled with the granulation of the resulting melt by an improved method which allows more efficient operation. The granulation technique involves the spraying of anhydrous melt directly from the pipe reactor onto seed recycle granules of the same composition as the melt. The granulation step of our process normally occurs in a rotary drum with specially designed internals. The internals include lifting flights, inclined collecting pan(s), and the spraying system. The granules are elevated by lifting flights and fall a short distance to the collecting pan(s) before reaching the apex of the drum. The granules are directed by the inclined collecting pan into the form of a curtain of falling material. A spray of molten ammonium polyphosphate then is directed onto this curtain of falling granules. With cooling provided by countercurrent air flow through the drum, a thin layer of melt on the coated granule solidifies and thus builds the plethora of granules therein in size. The granulation technique of the instant invention allows for moisture and heat removal whereby substantially all of the polyphosphate $P_2O_5$ just previously produced in an enlarged pipe reactor is retained in the product. The granular product resulting from the practice of the instant invention is superior to that product by prior art processes because it is hard, of low moisture content, and the structure of the granule is arranged so that the ammonium phosphate, polyphosphates, and metal phosphates $[FeNH_4(HPO_4)_2 \cdot nH_2O$, $(Mg, Al, Fe)NH_4HP_2O_7F \cdot nH_2O$, and $MgAl(NH_4)_2H(PO_4)_2F_2]$ and others $(MgAl_2F_8)$ are layered onto the seed recycle in such a manner that the granule dissolves rapidly when it is used to make base fluid fertilizers. Alternatively, the granules are well suited to be used directly in bulk blends to make various grades of fertilizers.

BACKGROUND OF THE INVENTION

1. Field of the Invention

Ammonium phosphate is effective for fertilizer use because of its favorable physical properties, high concentration of plant foods, and because it provides an economical method of fixing ammonia in a solid form. This material is attractive because it is a multinutrient fertilizer that has been demonstrated to be a very effective source of the major plant nutrients nitrogen and phosphorus. Agronomic data show that ammonium phosphate is particularly suited for use in acid soils when residual acidity thereof has been neutralized.

Monoammonium phosphate has been produced commercially in the United States, Canada, and European countries, such as England and Spain, principally from the reaction of ammonia and wet-process phosphoric acid by processes such as those that were developed by the Imperial Chemical Industries of England and the Scottish Agricultural Industries of Scotland; however, products produced by both of these processes are nongranular and are dusty and, for this reason, are impractical for use as a direct application material or for the production of bulk blends. Products produced by the practice of the process of the instant invention will be dust free and of such particle size distribution that they are well suited for the production of bulk blends and direct application.

2. Description of the Prior Art

In U.S. Pat. No. 3,153,574, Achorn et al disclose a process for the manufacture of diammonium phosphate from wet-process phosphoric acid and ammonia; however, this process requires the use of a preneutralization step which, in turn, requires a large preneutralizer tank. A principal advantage of the instant invention is that this requirement of Achorn et al of the preneutralization step and the large preneutralizer tank has been eliminated. In addition, our process eliminates the need for a separate step to dry the solid ammonium phosphate products. Elimination of the expensive and difficult drying step is important in that it decreases investment and operating costs, as well as substantially decreasing energy requirements. Pollution abatement considerations associated with these teachings of Achorn et al are greatly simplified by following the teachings of the instant invention since the greatest source of fumes and dust in Achorn et al supra is eliminated by the process of the instant invention.

In U.S. Pat. No. 2,902,342, Kerley et al, a process is described for the production of ammonium phosphate sulfate. However, in Kerley's process, both a complicated acid preparation and a first ammoniation step are required. The first ammoniation step is quite similar to the preneutralization step described by Achorn et al supra. A primary objective of the instant invention is to eliminate these extra steps and the complicated and expensive equipment thereby required. We have discovered that this objective can be accomplished by using a specially designed pipe-cross reactor to effect the neutralization of the acid.

In U.S. Pat. No. 3,985,538, Hicks et al disclose a process for the production of granular ammonium polyphosphate fertilizer in which the ammonium polyphosphate melt is prepared in a pipe reactor and dispersed through a series of apertures in the wall of the pipe to bind small particles of fertilizer into granules. However, a preneutralization step is required. This step is also quite similar to the preneutralization step described by Achorn et al supra. The practice of the instant invention eliminates this step thought to be necessary by Hicks et al as well as the extra reaction, transfer, and metering equipment therein required.

In U.S. Pat. No. 4,134,750, Norton et al disclose a process for production of ammonium phosphate, ammonium phosphate sulfates, and urea-ammonium phosphate sulfates using a well-engineered pipe-cross reactor. They introduce sulfuric acid to this pipe-cross reactor in order to obtain up to about 30 percent polyphosphate in their end product. In doing so, they have to add copious amounts of sulfuric acid in order to initially make about 60 percent polyphosphate in the melt produced in their pipe-cross reactor. This is necessary in that they retain only about one-half of this polyphosphate in their final granular product (see Example III, test PCX-6). In other words, the hydrolysis of the polyphosphate $P_2O_5$ to orthophosphate $P_2O_5$ is very substantial. In addition, their costs to obtain an end product having 30 percent polyphosphate are very high. For instance, there is the raw material cost of excessive amounts of sulfuric acid used, and the high costs of the materials of construction of the equipment required since the use of such amounts of sulfuric acid provides a highly corrosive environment. In the process of the instant invention, we can produce an end product of granular ammonium polyphosphate containing 27 percent polyphosphate with the melt produced in our pipe reactor containing also only about 27 percent polyphosphate $P_2O_5$. Our process retains a higher proportion of the polyphosphate in the granular product without use of sulfuric acid than that made by Norton et al supra and any known conventional pipe reactor-drum granulation process of ammonium polyphosphate where sulfuric acid is used. Also, our product is harder, rounder (sphericity is about 30% or greater) and has excellent physical properties that are well suited for both bulk blends and high-quality suspensions because it contains 20 percent to 30 percent of the total $P_2O_5$ as polyphosphate that has layers of metal phosphates and metal impurities on the seed recycle.

In U.S. Pat. No. 4,337,079, Mann et al describe an enlarged pipe-cross reactor which is similar to the one used in the instant process whereby they produce melts containing about 20 percent to about 30 percent polyphosphate without use of sulfuric acid. They do not try to granulate their melts but rather produce suspensions from them. Their enlarged pipe reactor is operated under pressures less than 20 psig i.e., their pipe reactor is submerged under liquor in order to prevent ammonia loss. The pressure they operate their reactor under is that encountered by the raw materials that is fed to the reactor, whereas we pressurize our enlarged pipe reactor in order to fix all the ammonia as well as use it to spray melt onto seed recycle in the granulator.

In particular, the present invention relates to granulation in an enclosed vessel, such as, for example, a rotating drum granulator, wherein air is or can be ventilated therethrough, and wherein said air does or can be made to come in contact with the material therein granulated and/or the wall or internals of the vessel which contact said materials such that the air can be used to either directly or indirectly transfer heat from the material which is therein solidified and cooled.

In many processes for granulation of mixed fertilizer previously known to the art, such as those taught in both U.S. Pat. No. 2,926,079, Smith, and U.S. Pat. No. 2,798,801, Kieffer et al, a drying step is required to remove excess moisture. The process of the present invention eliminates the need for such a drying step. The process of the instant invention also eliminates the need for a pressurization step as well as the requirement for special equipment, such as the dehydration chamber, disclosed in U.S. Pat. No. 3,415,638, Hamsley et al.

One of the classical methods of granulating is gas prilling wherein droplets of molten material are formed by any number of means and are allowed to fall through tremendous volumes of gas flowing countercurrent thereto. Heat is removed by the flowing gas allowing the granules to solidify. Examples of some such processes are described by Williams et al (U.S. Pat. Nos. 2,402,192 and 2,774,660) wherein respectively a 95 percent aqueous solution of ammonium nitrate and a substantially anhydrous, ammonium nitrate melt were the sprayed materials. Gas prilling is now one of the foremost granulation processes worldwide, but it has many disadvantages, one of which is the tremendous amount of cooling air required. Also, the cost of construction for this type of plant is high. Prills are inherently small and, for most materials, contain voids and/or surface dimples.

Other researchers have disclosed methods of reducing the tremendous volume of countercurrent gas flows in shot towers by external cooling loops such as that of Jewett et al (U.S. Pat. No. 1,837,869) wherein the gas is passed through a cooler supplied with cooling coils in which a brine solution circulates and precools the air before it enters the shot tower, thus in effect reducing somewhat the size of tower and quantity of cooling air required, but with the attendant expense of installing external coolers.

In further similar disclosures, Ishizuka et al (U.S. Pat. No. 3,058,159) and Klopf (U.S. Pat. No. 3,231,640) advocated introducing water in the form of a spray or mist in the incoming air at the bottom of the shot tower. The water droplets would be small enough to be carried up the shot tower and evaporate as they come into contact with the larger falling particles of granulating material. However, because of the direct contact of the water droplets and the solidifying particles, this method of heat removal is not practical for practice of the process of the instant invention wherein it is desirable that the product be discharged from the shot tower dry, such as in sulfur granulation; where the granulating material is hydroscopic, such as in urea granulation; or where direct contact of water and granules is prohibited for any reason chemical or physical. For those knowledgeable in the art, it is obvious that the teaching of Jewett et al, Ishizuka et al, and Klopf supra could be combined such that precooling is done by evaporation of water external of the shot tower such as in a humidifying chamber and then introduced to the tower as a somewhat precooled humid air free of water mist. Those knowledgeable in the art will also appreciate that precooling by this nature is limited severely in humid climates and almost useless when granulating hydroscopic products such as urea.

Disclosures made by Bottai et al (U.S. Pat. No. 3,578,433) and Campbell (U.S. Pat. Nos. 3,334,159 and 3,550,195) among others, advocated prilling into a liquid in which the prilled material was either insoluble or only slightly soluble. Bottai's invention involved prilling urea-ammonium polyphosphate in various liquid mediums. Campbell's disclosures involved prilling sulfur into water. These liquid cooling processes eliminated the use of gas and its associated problems but resulted in other problems. The prills retained a portion of the cooling medium which either had to be removed by other means, such as heating and drying, or had to be accepted as impurities in the product. Prills from liquid granulation were inherently small and still contained voids and/or surface dimples.

In U.S. Pat. No. 3,398,191, Thompson et al disclose a granulation process in which urea seeds are charged to the bed formed in a rotary drum. As the drum rotates, flights raise the solid particles from the bed and shower them down throughout the cross section of the drum. Urea is sprayed onto the cascading granules to build the granules in size. Air is drawn countercurrent to the product flow through the cooling section of the drum and then to the granulating section. No supplemental cooling external of the rotary drum was used in the example given, but their disclosure indicated that it could be employed as it was in the granulation of ammonium nitrate. In a somewhat similar disclosure in U.S. Pat. No. 3,877,415, Blouin describes a rotary drum process for applying coating to solid particles in which, by example, he shows its effectiveness as a coating or granulating apparatus in spraying sulfur onto a substrate as it falls in a continous curtain at a predetermined distance away from a number of spray nozzles. Blouin briefly proposes three possible ways of removing the heat given off by solidification of the sprayed material. Cooling gases could be passed through the granulating drum to directly contact the granules and absorb the heat; the material to be solidified might be sprayed in the form of a solution; and the evaporation of the solvent into a hot air stream could remove the heat of crystallization, or as he states, "by maintaining the particulate feed at a sufficiently low temperature that the resulting product emerges at a temperature below the fusion temperature of the coating medium." Those familiar with the art of granulation recognize that the latter can be done by recycling material through the drum while cooling the material external of the drum.

Rotary drum granulation processes make it possible to produce granules with improved physical characteristics over prilled materials, as is shown by example in the disclosure of Thompson et al. However, cooling is still a problem generally requiring the use of large quantities of cooling air or the recycle of large quantities of externally cooled granular material, both of which are expensive energy consuming ways of removing the heat associated with the granulation.

Sulfur slating as disclosed by Ellithrope and Fletcher in U.S. Pat. Nos. 3,885,920 and 3,838,973 allows the use of relatively inexpensive cooling medium water without the inherent problems associated with water prilling. This process is one of the primary methods of sulfur granulation employed at present. However, the product resulting from this process is not resistant enough to breakage and abrasion to allow it to meet some air pollution and safety standards which will become effective in the near future.

Berquin discloses in U.S. Pat. No. 3,231,413 a granulation process using a modified fluidized bed whereby a liquefiable material is injected into an incoming fluidizing gas and results in the impaction of particles of the liquefiable material onto the fluidized granules, thus gradually building them in size. Berquin's disclosure teaches that water can also be injected into the gas flow along with the liquefiable material provided the liquefiable material is not hygroscopic. According to the disclosure, the water impinges on the flowing bed of granules where it is immediately vaporized as steam and maintains the gaseous flow stream at 100° C., thus removing heat from the process.

Sulfur has been commercially granulated by the Berquin process supra; whether or not these plants have used the evaporative cooling step is not known. Some sulfur processors considering the use of the Berquin process have noted the added expense which may be associated therewith because of high electrical power consumption necessary for the maintenance of the fluidized bed.

In U.S. Pat. No. 3,936,534, Schallis disclosed a blend of the rotary-drum granulation type process and water cooling. The water is atomized directly on a rolling bed which has no lifting flights as opposed to the disclosures of Thompson et al and Blouin supra. Sulfur is also fed directly to the bed, and the heat of solidification and cooling is primarily removed by water cooling. Air is used to promote drying in some instances. Schallis's invention, however, like Berquin's water cooling disclosure supra, appears suitable only for adaptation on hydrophobic materials, such as, for example, sulfur.

Shirley, U.S. Pat. Nos. 4,213,924, 4,424,176, and 4,506,453, uses relatively expensive equipment in his falling curtain method whereby he adds water for cooling and fans installed, as well as utilized inside the granulating drum to remove heat. In the process of the instant invention, we use lifting flights and inclined pan(s), but we do not require water addition and electric fans to evaporate water and cool the product. Cooling in our process is very important, but is simple in that when the melt and steam discharges from the enlarged pipe reactor the nominal air flow removes the steam leaving essentially an anhydrous melt for coating the seed recycle. Most of the heat is removed simultaneously with the steam.

Prior art arrangements in the processes of the above-mentioned types have proved to be operative; however, such processes require the expenditure of substantial amounts of capital for such relatively expensive equipment as large preneutralization tanks and acid preparation tanks, along with their associated piping, transfer, metering equipment, and fans for removal of heat.

SUMMARY OF THE INVENTION

Our invention in certain embodiments thereof is similar to the teachings Mann et al and Shirley supra in that we use an enlarged pipe reactor, but we pressurize it and maintain about 50 psig therein to effect good ammonia fixation, spray patterns, and flashing of the water from and in the molten ammonium polyphosphate. Our invention is also somewhat similar to Shirley in that we spray or coat the seed recycle material as it falls from a curtain; however, we do not use fans, add water, or require a large number of flights or pans. Our invention involves first the preheating of merchant-grade wet-process acid to about 200° F. with steam in a preheater. The heated acid is then ammoniated in an enlarged, pressurized pipe reactor to produce an anhydrous melt which is sprayed directly from the pipe onto recycle granules of the same composition as the melt.

The reaction of ammonia with phosphoric acid in the pressurized pipe reactor produces heat that evaporates free water from the reactants and removes all of the free water and part of the chemically bound water in the phosphoric acid to yield an essentially anhydrous melt. Since essentially an anhydrous melt is sprayed onto the recycle in the granulation drum, no drying is required in the process of the instant invention, and there is no agglomeration between granules. The pipe reactor has to be pressurized to about 50 psig in order to spray the melt onto the falling curtain of granules in the granulation drum. A pipe reactor is used instead of a pressurized vessel because earlier tests clearly showed and demonstrated that extent of hydrolysis of polyphosphate formed in the process is directly proportional to the retention time of the melt in the reactor.

Granulation occurs in a rotary drum with the specially designed internals. These internals include some lifting flights, an inclined collecting pan, and a spraying system. The granules are elevated by lifting flights and fall a short distance to the collecting pan before reaching the apex of the drum. The granules are directed by the inclined collecting pan into the form of a curtain of falling material. A spray of molten ammonium polyphosphate then is directed onto this curtain of falling granules. With cooling provided by airflow through the drum, a thin layer of melt on the coated granule solidifies and thus builds the granules in size. Granules discharge from the drum to a rotary cooler. The granules then are screened to remove oversize material from the product stream. The product is usually −6+10 Tyler mesh. The undersize material is collected in a surge hopper and recycled to the granulator at a metered rate. The oversize material is crushed and returned to the screening unit. Results thus far have shown that the falling-curtain process of the instant invention retains a higher proportion of the original polyphosphate formed in the melt stage of the product than that made in conventional pipe reactor-drum granulator process for producing ammonium polyphosphate.

The gist underlying the instant invention is the discovery of operating parameters which allows for a process wherein there is essentially no degradation in the amount of $P_2O_5$ values produced as polyphosphate from the melt stage to the stage of product recovery, i.e., we have discovered the parameters for operating the process wherein essentially no hydrolysis of the polyphosphate $P_2O_5$ values occurs.

From a review of the prior art teachings and their experiences and our FIG. 4, it would appear that the three main factors which can and do contribute to such hydrolysis degradation of polyphosphate are time and temperature, maximum operating temperature, as well as water entrapment and/or disengagement thereof of the melt. A comparison of the operating parameters of the instant invention with those of Norton and Parker supra, U.S. Pat. No. 4,134,750, examples 1 and 2, columns 7-9, shows that we normally operate with about the same temperatures and times at these temperatures as they do. Accordingly, since under these maximum conditions, we still do not experience any appreciable amounts of hydrolyzation; we can only conclude that what makes our invention work is our control of the third factor, to wit, water entrapment or disengagement.

The concept of water disengagement given for polyphosphate melts is definitely not a new concept, nor for that matter a newly unveiled problem. See, for instance, U.S. Pat. No. 3,773,191, Meline et al, wherein this problem was addressed through the expedience of construction and operation of a rather complicated piece of equipment, to wit, the foam disengager vessel as described in FIGS. 4 and 5 and also described in column 11 line 42, through column 12, line 42; and column 13, line 46 through column 14, line 44. Obviously, in the operation of the instant invention, we are not proposing the use of such a mechanical monster but have unexpectedly discovered a set of operating parameters wherein the desired objectives thereof are realized. Since the position of the enlarged pressured spraying system in the rotating drum in relationship to the spray therefrom onto the falling curtain has proven to be highly critical. See Example IV, Table V.

We believe that this arrangement effectively disengages substantial quantities of chemical and free water from the melt as it travels to and coats the particles in the falling curtain to thereby effect attainment of the main objective of the instant invention infra.

OBJECTS OF THE INVENTION

It is therefore an object of the present invention to provide a process which substantially reduces the problems associated with the aforementioned processes of the prior art. The present invention provides a means of granulation whereby the heat removal can be accomplished without contaminating the product by direct contact with a cooling liquid such as with the processes of Schallis, Campbell, Bottai, Ellithrope et al, Berquin, Ishizuka et al, Klopf, and others. It involves cooling without the use of massive amounts of air as disclosed by Thompson et al and Williams et al, and alluded to by Blouin. It does not require a tremendous amount of recycle as used in classical granulation processes.

Further, it is an object of the present invention to produce granules which are hard, spherical, closely sized in a wide selection of sizes, and resistant to both impact and abrasion, and thus are at least as good a quality product as any product made using a process of the present art, and better than most.

A still further object of the present invention is to provide a means of granulation which will be safe and eliminate pollution problems of both air and water which exist with many present processes.

Yet still another object of the present invention is directed to the development of an improved process for producing high-analysis granular ammonium polyphosphate material in relatively inexpensive equipment that can be installed inside of a conventional rotary granulator.

DESCRIPTION OF THE DRAWINGS

The present invention, together with further objects and advantages thereof, will be better understood from a consideration of the following description taken in connection with the accompanying drawings in which.

Figure 1:
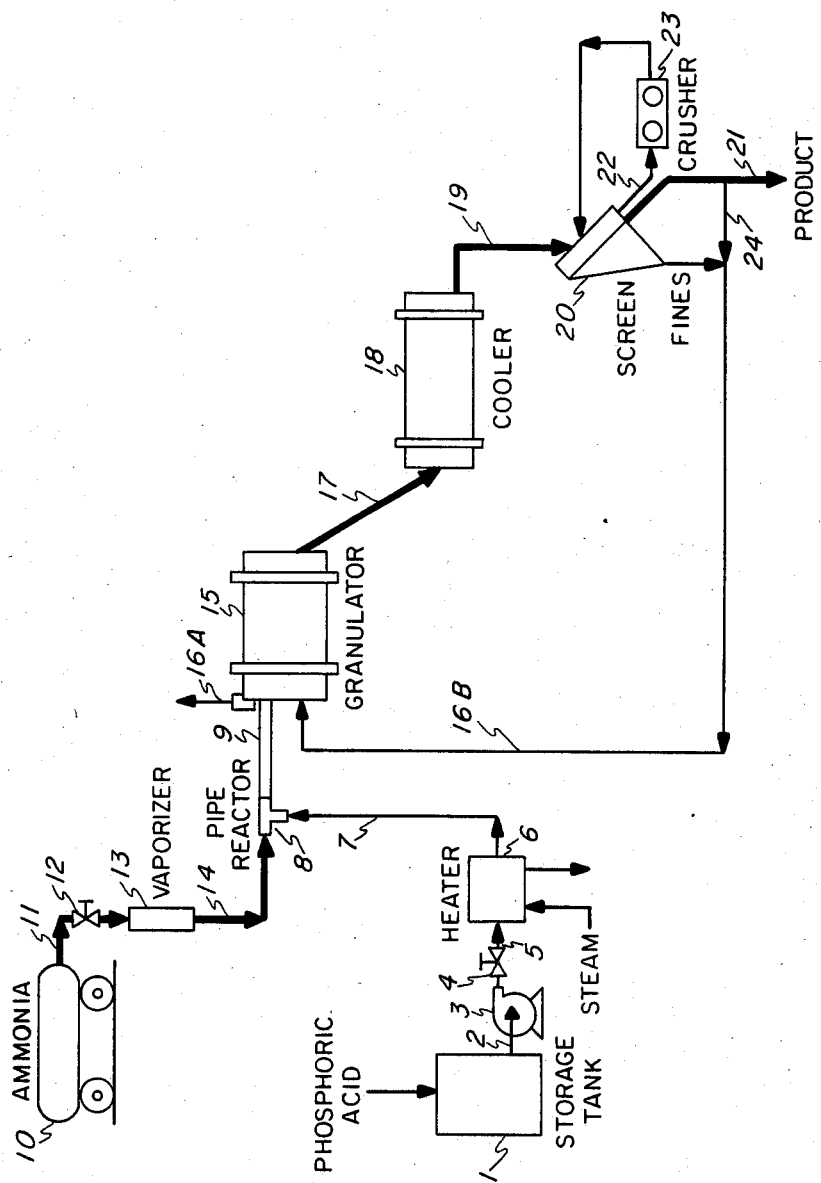
FIG. 1 is a flow diagram for granulation by the process of the instant invention.
Figure 3:
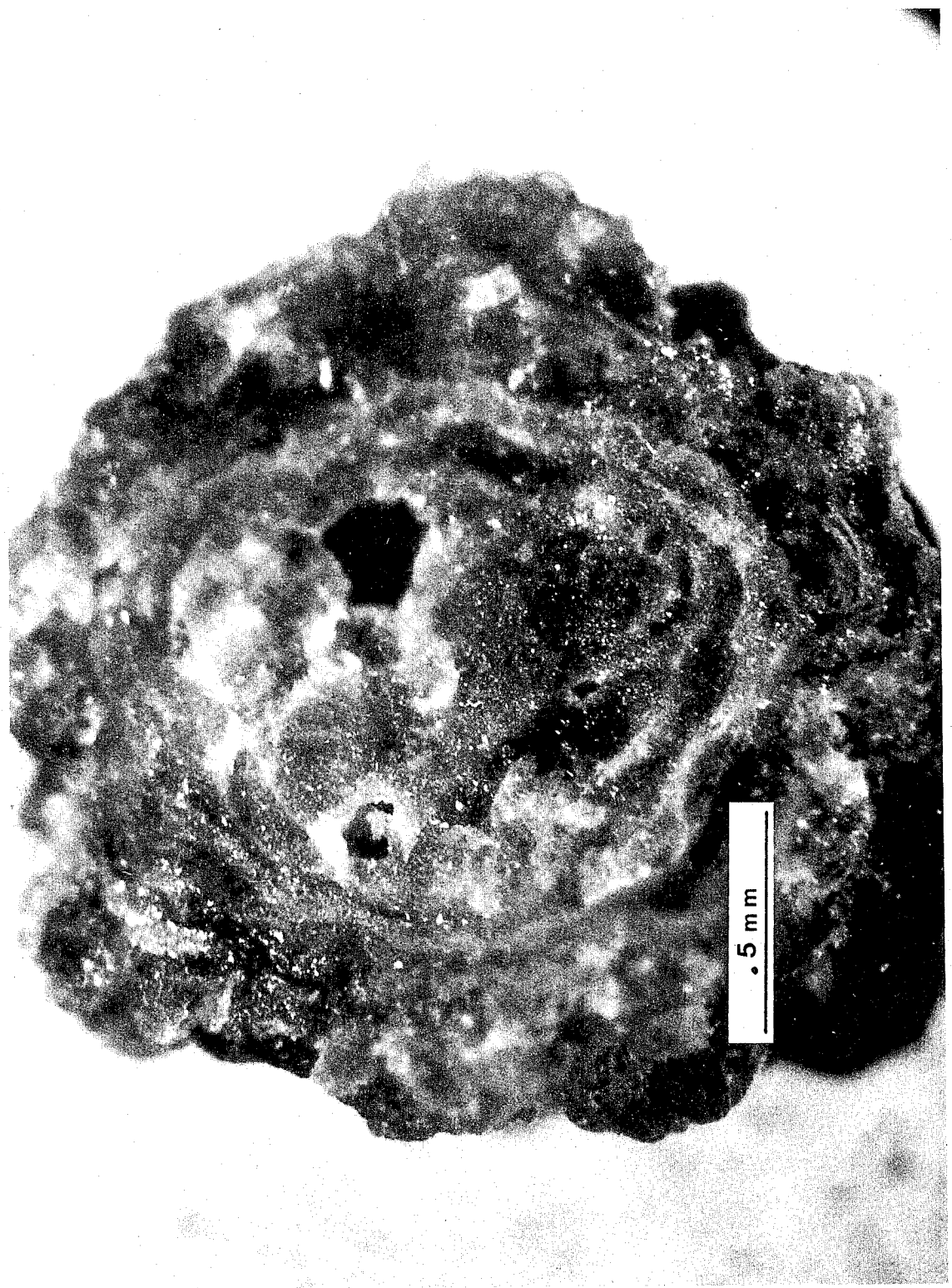
FIG. 3 is a photomicrograph at 90X of a granule illustrating the layers of metallic phosphates effected by the instant invention.

Referring now more specifically to FIGS. 1 and 3 merchant-grade wet-process phosphoric acid is stored in and fed from tank 1 via line 2 to metering means 3, and means for control of flow 4, through line 5 to acid heater 6. From acid heater 6 the acid goes through line 7 to tee 8 and on to enlarged pipe reactor 9. Liquid ammonia from storage tank 10 is fed via line 11, and means for control of flow 12, to ammonia vaporizer 13 and on through line 14 to tee 8 and pipe reactor 9 which pipe reactor 9 is operated under pressure. After ammoniation of the wet-process acid in pressurized pipe reactor 9, the resulting anhydrous ammonium polyphosphate melt sprays and atomizes in a manner that it comes in contact with granules existing in drum ganulator 15 such that it solidifies as a thin film on these granules as shown in the photomicrograph of FIG. 3. The separate mist of water discharging from pipe reactor 9 is removed rapidly by sufficient countercurrent air flow by means not shown through line 16A. If desired, the air flow can be scrubbed by any conventional means. It is the intent of the present invention to remove the water discharging from said pipe reactor so rapidly that the molten ammonium polyphosphate is anhydrous and retains essentially no water nor allows any water to impinge on the granules. Recycle material of the same composition enters drum granulator 15 via line 16B by any means of control which is not shown. The recycle material is fed into the drum in amounts necessary to form a bed therein. The material discharges from drum granulator 15 via line 17 to cooler 18 then to screen 20 via line 19 where it is screened and the undersize portion is returned via line 16B to drum 15 as recycle material and the onsize is product 21. The oversize goes through line 22 to crusher 23 and the resulting crushed material is returned to screens 20. Due to the high efficiency and extremely low recycle ratio experienced when operating our process according to the preferred embodiments thereof, it is oftentimes the experience of the operator to find that due to said low recycle ratio, there are insufficient fines available for return via line 16B to granulator 15 for optimum operations of the process. Accordingly, it may be desirable to divert a portion of the product-size material from line 21 via line 24 directed to combination with the stream of fines via line 16B to granulator 15.

Figure 2:
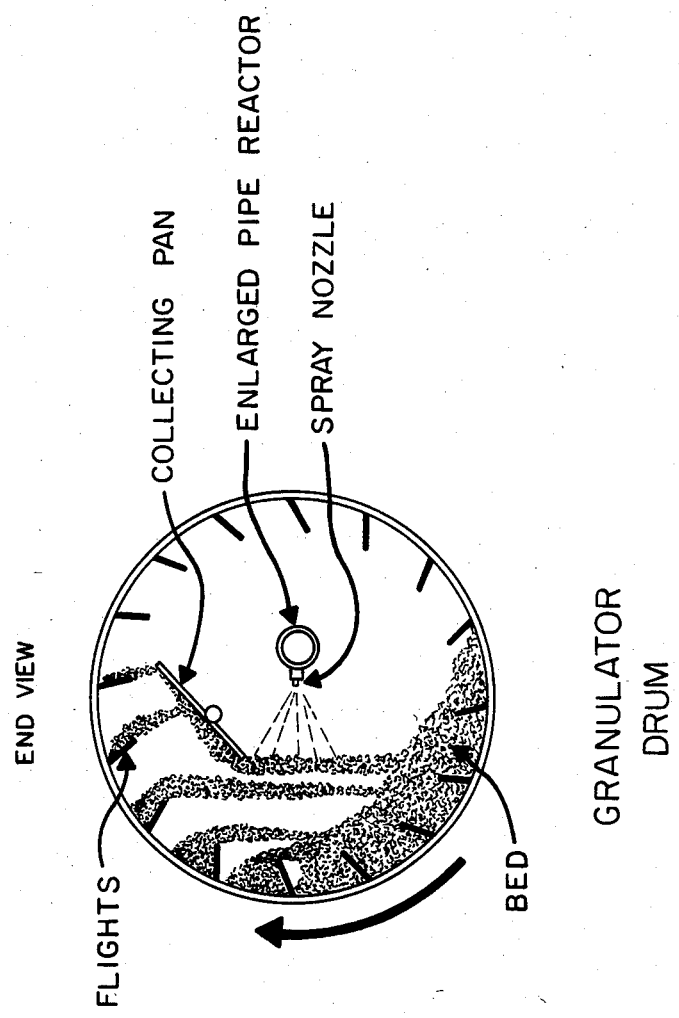
FIG. 2 is a discharge end view of the granulator drum showing the relative positions of the internals.

Referring now more specifically to FIG. 2, an end view of granulator drum 15 is shown therein. As shown therein, the internals include lifting flights, an inclined collecting pan, and a spraying system.

DESCRIPTION OF THE PREFERRED EMBODIMENTS IN CONJUNCTION WITH THE EXAMPLES

In order that those skilled in the art may better understand how the present invention can be practiced, the following examples for the production of ammonium polyphosphate granular fertilizer are given by way of illustration only and not necessarily by way of limitation.

Merchant-grade acids used in the examples infra had the following compositions as shown in Table I below.

TABLE 1

| Acid | Chemical analysis, % by wt | | | | | | | |
|---|---|---|---|---|---|---|---|---|
| | $P_2O_5$ | $Fe_2O_3$ | $Al_2O_3$ | F | MgO | $SO_4$ | $H_2O$ | W.I. Solids |
| Example I | 53.5 | 0.95 | 1.6 | 1.0 | 0.74 | 3.5 | 18.5 | 1.4 |
| Example II | 54.1 | 1.1 | 1.5 | 1.0 | 0.79 | 3.4 | 17.5 | 1.7 |
| Example III | 53.9 | 1.0 | 1.6 | 1.0 | 0.79 | 3.5 | 17.8 | 1.7 |
| Example IV | 51.4 | 1.0 | 1.6 | 1.0 | 0.79 | 3.5 | 21.3 | 1.7 |

Examples I, II, III illustrate the importance of sizing the pressure reactor to produce a melt for good granulation. Example IV illustrates the importance of maintaining the proper operating conditions for producing superior granules of ammonium polyphosphate.

EXAMPLE I

The first series of tests was performed using a pressure vessel measuring 5-inches diameter and 12-inches high with a capacity of 236 in$^3$ in which vessel wet-process orthophosphoric acid was ammoniated (about 1 mole of $NH_3$ per mole $H_3PH_4$) and retained in the stirred reactor (four 3-inch diameter turbines rotated at 600 rpm) for 4, 7, 10, and 20 minutes before discharging. The phosphoric acid was fed to the reactor at various rates (24 to 67 pounds per hour), and various temperatures (81° F. to 217° F). The reactor was operated under 40 to 46 psig. The pressure was maintained at a constant rate throughout the test by bleeding off excessive steam. In all the tests, the operating time was limited to 1 to 2 hours because problems were encountered with the melt solidifying in the short transfer line (½-inch tubing, 38-inches long). Control of the melt level in the reactor was also erratic because excessive foaming prevented good control with the level lights that were on the reactor. The feed rates and operating data obtained during these tests are summarized in Table II below. Results show that generally a 10-55-0 grade nongranular product was made containing polyphosphate contents ranging from 1 precent to 8 percent of the total $P_2O_5$. Those skilled in the art appreciate that a minimum of about 12 percent of the $P_2O_5$ must be in the polyphosphate $P_2O_5$ form to produce an adequate suspension. Therefore, if one were to practice according to the parameters outlined herein higher levels of poly $P_2O_5$ (at least 15 to 20%) would be made in order to allow for hydrolysis of the polyphosphate $P_2O_5$ to orthophosphate $P_2O_5$ during storage.

TABLE II

| | Test number | | | |
|---|---|---|---|---|
| | 1 | 2 | 3 | 4 |
| Production rate, lb/h | 24 | 48 | 50 | 65 |
| Length of test, min | 65 | 120 | 65 | 60 |
| Phosphoric acid | | | | |
| Lbs/h | 24 | 49 | 51 | 67 |
| Temperature to reactor, °F. | 169 | 168 | 217 | 81 |
| Ammonia (gaseous) | | | | |
| Lbs/h | 3.7 | 7.4 | 8.5 | 11.2 |
| Temperature to reactor, °F. | 99 | 83 | 68 | 72 |
| Back pressure, psig | 60 | 60 | 60 | 60 |
| Reactor | | | | |
| Reactor temperature, °F. | 370 | 416 | 422 | 375 |
| Retention time, mins | 20 | 10 | 7 | 5 |
| Reactor pressure, psig | 40 | 46 | 43 | 40 |
| Throughput | | | | |
| Lb $P_2O_5$/hr · in$^2$ | 0.65 | 1.34 | 1.39 | 1.83 |
| Lb $P_2O_5$/hr · in$^3$ | 0.094 | 0.191 | 0.199 | 0.261 |
| Product (non-granular) | | | | |
| pH (10% in $H_2O$) | 3.4 | 3.2 | 3.1 | 2.8 |
| Chemical analysis, % | | | | |
| Total N | 10.5 | 10.4 | 10.6 | 9.8 |
| Total $P_2O_5$ | 56.1 | 57.3 | 57.6 | 55.8 |
| Ortho $P_2O_5$ | 53.4 | 52.3 | 52.8 | 55.3 |
| $NH_3$:$H_3PO_4$ mole ratio | 0.95 | 0.92 | 0.93 | 0.89 |
| $H_2O$ (AOAC), free | 1.7 | 0.9 | 0.8 | — |
| % poly (of total) | 5 | 8 | 8 | 1 |

EXAMPLE II

After the first series of tests, it was thought that the operating problems were caused by the enormous heat loss from such small operations. Therefore a larger vessel (12-inch diameter, 30-inch high) equipped with turbine agitators (two 5½ inch diameter turbines) was insulated and used to make some tests at acid-feed rates of 100 to 200 lb per hour and, as in example number 1, the acid was ammoniated with about 1 mole of ammonia per mole of $H_3PO_4$. The acid-feed temperature was varied from about 100° F. to 200° F. The retention and pressure of the reactor was varied from 15 to 30 minutes and from 21 to 41 psig together with the above conditions in an attempt to increase the polyphosphate of the melt produced by the reactor, however, as shown in Table III below, the highest polyphosphate content obtained was 9 percent of the total $P_2O_5$. The grade of the non-granular product was about the same as in Example I supra. Therefore, other tests were begun and a summary of the source of the results thereof is taught in Example III infra.

TABLE III

| | Test number | | | |
|---|---|---|---|---|
| | 5 | 6 | 7 | 8 |
| Production rate, lb/h | 200 | 200 | 100 | 100 |
| Length of test, min | 145 | 150 | 105 | 145 |
| Phosphoric acid | | | | |
| Lbs/h | 206 | 206 | 103 | 103 |
| Temperature to reactor, °F. | 197 | 197 | 99 | 153 |
| Ammonia (gaseous) | | | | |
| Lbs/h | 40.4 | 40.4 | 20.2 | 20.2 |
| Temperature to reactor, °F. | 122 | 76 | 92 | 88 |
| Back pressure, psig | 80 | 80 | 80 | 80 |
| Reactor | | | | |
| Reactor temperature, °F. | 397 | 379 | 303 | 391 |
| Retention time, mins | 15 | 15 | 30 | 30 |
| Reactor pressure, psig | 40 | 21 | 38 | 41 |
| Throughput | | | | |
| Lb $P_2O_5$/hr · in$^2$ | 1.00 | 1.00 | 0.50 | 0.50 |
| Lb $P_2O_5$/hr · in$^3$ | 0.077 | 0.077 | 0.038 | 0.038 |
| Product (non-granular) | | | | |
| pH (10% in $H_2O$) | 2.7 | 3.1 | 3.6 | 3.4 |
| Chemical analysis, % | | | | |
| Total N | 9.6 | 10.1 | 8.7 | 11.1 |
| Total $P_2O_5$ | 57.2 | 57.0 | 44.9 | 56.5 |
| Ortho $P_2O_5$ | 54.0 | 52.7 | 44.4 | 51.5 |
| $NH_3:H_3PO_4$ mole ratio | 0.85 | 0.90 | 1.15 | 1.00 |
| $H_2O$ (AOAC), free | — | — | — | — |
| % poly (of total) | 6 | 8 | 1 | 9 |

EXAMPLE III

In this series of tests, an enlarged pipe reactor (nominal ½-inch pipe, 10 feet long) was installed connecting the 12-inch diameter reactor that was used in Example II supra to ensure that the ammonia was being well mixed in the pipe reactor before entering the 12-inch diameter reactor and the melt was retained in this reactor for 10 to 40 minutes before discharging. As shown in Table IV below, the polyphosphate level of the melt was essentially the same as that obtained in previous tests summarized in Examples I and II supra. The product was nongranular and operation for the production of same proved to be difficult.

TABLE IV

| | Test number | | | |
|---|---|---|---|---|
| | 9 | 10 | 11 | 12 |
| Acid rate, lb/h | 100 | 200 | 200 | 200 |
| Acid temperature, °F. | 202 | 69 | 69 | 200 |
| Pipe reactor temperature, °F. | 447 | 381 | 391 | 452 |
| Feed $NH_3:H_3PO_4$ mole ratio | 1.0 | 1.0 | 1.0 | 1.0 |
| Spray nozzle | None | 6510 | None | None |
| Pressure reactor | | | | |
| Retention time | 40 | 20 | 20 | 10 |
| Temperature, °F. | 377 | 380 | 346 | 429 |
| Pressure, psig | 39 | 35 | 26 | 35 |
| Product | | | | |
| pH | 3.3 | 2.9 | 3.1 | 3.4 |
| % N | 11.1 | 10.4 | 10.8 | 10.9 |
| % $P_2O_5$ | 58.1 | 57.1 | 57.0 | 56.3 |
| $NH_3:H_3PO_4$ | 0.97 | 0.93 | 0.96 | 0.98 |
| % of poly $P_2O_5$ | 9 | 5 | 8 | 22 |
| $P_2O_5$ as avail. $P_2O_5$ | 99.98 | 100 | 100 | 100 |
| % $H_2O$ | 0.51 | 0.98 | 0.60 | 2.24 |
| Throughput | | | | |
| lb $P_2O_5$/hr · in$^2$ | 0.48 | 0.96 | 0.96 | 0.96 |
| lb $P_2O_5$/hr · in$^3$ | 0.037 | 0.074 | 0.074 | 0.074 |

EXAMPLE IV

The process for production of granular APP by pressure ammoniation of phosphoric acid in a pipe reactor and subsequent melt granulation in a curtain granulator is illustrated in FIG. 1 supra. In the series of tests comprising this example, merchant-grade wet-process acid was pumped by a metering pump and then preheated to a temperature of 200° F. by transfer of heat from steam. The heat exchanger was a single-pass shell-and-tube type with flow of the ammonium polyphosphate through the tubes. The total heating surface area was 1.6 ft$^2$. The heated acid was pumped to the branch side of a mixing tee (either ⅜-inch or ½-inch tee) located at the end of a horizontal pressurized pipe reactor. The pipe reactor was either 6 feet or 10 feet long and was constructed of nominal ⅜-inch diameter stainless steel pipe (AISI Type 316). The pipe was covered with 2 inches of insulation.

Gaseous anhydrous ammonia (100° F.) was fed to the run of the mixing tee at a metered rate to give a $NH_3:H_3PO_4$ mole ratio of 1.0. The ammonia entered the pipe reactor through a ¼-inch diameter lance that ended at the inlet of the pipe reactor.

The melt formed in the pipe reactor discharged from the reactor through a turned-down 90-degree elbow(s) and nozzle(s) with either a 65- or an 80-degree flat spray pattern. A back pressure of about 50 psig was maintained on the pipe reactor by the spray nozzle(s); this pressure provided good reaction, constant spray, and good melt distribution. The hot (about 450° F.) melt was sprayed onto a falling curtain of seed recycle granules (−10 mesh, Tyler) inside the curtain granulator.

The curtain granulator was 2-feet in diameter, 3-feet long, and rotates about between 10 and 22 RPM. The retaining ring at the feed end was 6-inches high, and the retaining ring at the discharge end was 5-inches high. The granulator was inclined with a slope of ½-inch from the feed end to the discharge end. Sixteen lifting flights were installed in the granulator at about 22-degree intervals. The flights were straight with flat surfaces 1-inch wide by 30-inches long. They were installed parallel to the axis of the drum and were canted 15-degrees forward from the radii of the drum. One collecting pan, 9-inches wide and 32-inches long, was installed parallel to the axis of the drum. The pan was sloped counter to the rotation of the drum at an angle so that the granules would fall from the pan producing a falling curtain. The recycle was fed to the granulator at a rate of about 3 pounds recycle per pound of product through a feeder. The temperature of the freshly sprayed granules discharging from the granulator was about 170° F. An induced draft fan provided air (about 4 ft$^3$/sec) for removing the steam from the melt when spraying.

The hot granules were discharged from the granulator and were cooled to about 120° F. in a rotating cooler (about 12 RPM) which was 18-inches in diameter and 4-inches long. The retaining ring at the feed end was 3-inches high and there was no ring at the discharge end. Eight lifting flights, 2-inches wide and 38-inches long, were installed at 45-degree intervals. The flights were canted forward about 15 degrees and a 1-inch lip was turned forward to provide a maximum lift for the hot granules. An induced draft fan provided about 1 ft$^3$/sec of air for cooling.

The cooled granules were then discharged directly onto an 18-inch diameter vibroscreen where they were screened. The recycle (−10 +16 mesh, Tyler) was returned to the recycle feeder by means of an auger-type conveyor. The oversize was removed for crushing and some of the product was returned to the system to maintain specific sizes of the product during granulation.

In the series of tests an enlarged pipe reactor was used only while the preheated acid (about 200° F.) was ammoniated at 1.0 mole of ammonia per mole of $H_3PO_4$ and the pressure in the reactor was varied from 23 to 75 psig. The results and operating data are summarized in Table V infra. Polyphosphate contents of 16 percent to 31 percent were obtained in the melts with little or no ammonia loss. Pressure allowed essentially no ammonia to be evolved at the end of the pipe reactor. In tests 13 and 14, the pipe reactor was nominal ½-inch pipe, AISI type 316 stainless steel, that was 10-feet long as was in a horizontal position, covered with 2-inches of calcium silicate insulation. In tests 15 through 18, the pipe reactor was a nominal ¾-inch diameter stainless steel pipe, AISI type 316, that was 6-feet long, with a 2-inch layer of calcium silicate insulation. The pipe reactors were designed so that the throughput was always less than 350 lb $P_2O_5/hr/in^2$ internal pipe area. Pipe reactors of this type are called "enlarged" because normal pipe reactors that are known by those skilled in the art are normally much greater than 200 and generally up to 700 lb $P_2O_5/hr/in^2$ or more (See Mann and Meline, U.S. Pat. No. 4,337,079, Table VII). In tests 13 and 14, the usual pilot-plant continuous-granulating equipment was not used to granulate the melt but some of the melt was granulated batchwise and the results showed that the melt was granulatable. In test 15 a cooler was not used but the melt was granulated easily and large ($-4 +6$ Tyler mesh), round granules were made without difficulty, and in some instances these larger than normal granules may be desired. Normally it is desired to have $-6 +10$ Tyler mesh granules for use in bulk blends and these same size granules can be used in making suspensions. In test 16 the high pressure (75 psig) on the pipe reactor made too many fines and dust, and normally is not desired. Tests 17, 18, and 19 represent examples of good operation wherein the pipe reactor was 6 to 8 inches from the falling curtain, and the melt was sprayed at a pressure of about 50 psig, and coated the granules in layers which made harder than normal granules that are nonlayered. It must be noted that our invention loses little or no polyphosphate as is evidenced by the polyphosphate levels that are in the melt versus that in the granular product. This is because the melt is quenched immediately when it leaves the pressure reactor. Also microscopic and chemical analyses of the granules show that iron and aluminum orthophosphates are present in these layers which cause the granules to be harder than nonround granular APP.

TABLE V

|  | TEST NUMBER | | | | | | |
|---|---|---|---|---|---|---|---|
|  | 13 | 14 | 15 | 16 | 17 | 18 | 19 |
| Production rate, lb/h | 95 | 95 | 47 | 71 | 95 | 47 | 110 |
| Length of test, min | 300 | 300 | 270 | 240 | 240 | 185 | 360 |
| Feed conditions | | | | | | | |
| Phosphoric acid | | | | | | | |
| Feed rate, lbs/h | 100 | 100 | 50 | 75 | 100 | 50 | 115 |
| Temp to reactor, °F. | 201 | 200 | 200 | 202 | 202 | 200 | 198 |
| Ammonia (gaseous) | | | | | | | |
| Feed rates, lbs/h | 12.8 | 12.8 | 6.4 | 9.6 | 12.8 | 6.4 | 14.7 |
| $NH_3:H_3PO_4$ feed mole ratio | 1.0 | 1.0 | 1.0 | 1.0 | 1.0 | 1.0 | 1.0 |
| Temp to reactor, °F. | 101 | 87 | 86 | 91 | 78 | 81 | 109 |
| Reactor | | | | | | | |
| Spray nozzle used | — | — | 6508 | 6510 | 6508/6510 | 11010 | 8010/8015 |
| Throughput | | | | | | | |
| Lb $P_2H_5$/hr · in$^2$ | 177 | 177 | 141 | 211 | 282 | 141 | 324 |
| Lb $P_2O_5$/hr · in$^3$ | 1.48 | 1.48 | 1.96 | 2.93 | 3.92 | 1.96 | 4.51 |
| Reactor temperature, °F. | 432 | 430 | 447 | 461 | 464 | 449 | 450 |
| Reactor pressure, psig | 48 | 23 | 57 | 75 | 57 | 45 | 49 |
| Melt discharge analysis | | | | | | | |
| pH (10% in $H_2O$) | 3.4 | 3.4 | 3.4 | 3.4 | 3.4 | 3.4 | 3.4 |
| Total N | 11.0 | 11.3 | 11.0 | 11.2 | 11.5 | 11.5 | 10.7 |
| Total $P_2O_5$ | 57.7 | 57.6 | 57.1 | 57.1 | 57.1 | 57.3 | 57.3 |
| Available $P_2O_5$ | 100 | 100 | 100 | 100 | 100 | 100 | 100 |
| % poly (of total $P_2O_5$) | 29 | 31 | 16 | 19 | 21 | 21 | 16 |
| $NH_3:H_3PO_4$ mole ratio | 0.97 | 1.0 | 0.98 | 1.0 | 1.0 | 1.0 | 0.95 |
| $H_2O$ (AOAC) free | 0.21 | 0.21 | 0.60 | 0.61 | 0.34 | 0.56 | 0.50 |
| Granulation conditions | | | | | | | |
| Curtain granulator | None | None | — | — | — | — | — |
| Curtain granulator RPM | — | — | 15 | 11 | 18 | 21 | 14 |
| Retention time, mins | — | — | 12.1 | 22.2 | 10.0 | 16.8 | 9.0 |
| Recycle:product wt. ratio | — | — | 7.3 | 2.0 | 4.0 | 5.0 | 3.8 |
| Airflow thru granulator, ft$^3$/sec | — | — | 4.0 | 4.0 | 4.0 | 4.0 | 4.0 |
| Temperature of bed, °F. | — | — | 146 | 150 | 201 | 142 | 223 |
| Screen analysis, (Tyler mesh), % | | | | | | | |
| +6 | — | — | 22.2 | 0.6 | 0.7 | 14.6 | 4.0 |
| −6 + 10 | — | — | 76.4 | 64.8 | 32.3 | 72.4 | 29.6 |
| −10 + 16 | — | — | 0.8 | 22.1 | 48.0 | 8.4 | 29.2 |
| −16 | — | — | 0.6 | 12.5 | 19.0 | 4.6 | 37.2 |
| Pipe reactor distance from falling curtain, in | — | — | 3 | 4 | 6 | 8 | 6 |
| Cooler | | | | | | | |
| Cooler, RPM | — | — | — | 6 | 11 | 20 | 13 |
| Airflow thru cooler, | — | — | — | 0.9 | 0.9 | 0.9 | 0.9 |

TABLE V-continued

| | TEST NUMBER | | | | | | |
|---|---|---|---|---|---|---|---|
| | 13 | 14 | 15 | 16 | 17 | 18 | 19 |
| ft³/sec | | | | | | | |
| Temperature of cooler, °F. | — | — | — | 98 | 139 | 112 | 155 |
| Screen analysis, (Tyler mesh), % | | | | | | | |
| +6 | — | — | — | — | — | 8.4 | — |
| −6 + 10 | — | — | — | — | — | 83.4 | — |
| −10 + 16 | — | — | — | — | — | 6.2 | — |
| −16 | — | — | — | — | — | 2.0 | — |
| Recycle | | | | | | | |
| Temperature of Recycle, °F. | — | — | 129 | 81 | 97 | 81 | 100 |
| Screen analysis, (Tyler mesh), % | | | | | | | |
| +6 | — | — | — | — | — | 5.3 | — |
| −6 + 8 | — | — | — | — | — | 31.4 | — |
| −8 + 10 | — | — | — | — | — | 55.3 | — |
| −10 + 12 | — | — | — | — | — | 5.6 | — |
| −12 + 16 | — | — | — | — | — | 2.2 | — |
| −16 | — | — | — | — | — | 0.2 | — |
| Product | | | | | | | |
| Screen analysis, (Tyler mesh), % | | | | | | | |
| +6 | — | — | 47.0 | 0.2 | 0.1 | 10.7 | 0.1 |
| −6 + 7 | — | — | 48.9 | 5.4 | 6.0 | 25.6 | 8.0 |
| −7 + 8 | — | — | 3.3 | 27.4 | 20.5 | 43.4 | 21.7 |
| −8 + 9 | — | — | 0.3 | 42.0 | 34.4 | 16.5 | 29.9 |
| −9 + 10 | — | — | 0.1 | 19.7 | 26.4 | 3.0 | 20.5 |
| −10 + 12 | — | — | 0.0 | 4.5 | 9.4 | 0.6 | 12.1 |
| −12 + 14 | — | — | 0.0 | 0.5 | 2.5 | 0.0 | 4.7 |
| −14 + 16 | — | — | 0.0 | 0.1 | 0.4 | 0.0 | 1.5 |
| −16 | — | — | 0.4 | 0.2 | 0.3 | 0.2 | 1.5 |
| Product analysis, % | | | | | | | |
| Total N | — | — | 12.2 | 11.7 | 12.2 | 12.1 | 11.3 |
| Total P₂O₅ | — | — | 55.5 | 56.7 | 56.5 | 56.2 | 56.7 |
| Available P₂O₅ | — | — | 100 | 100 | 100 | 100 | 100 |
| % poly (of total P₂O₅) | — | — | 16 | 19 | 21 | 20 | 16 |
| NH₃:H₃PO₄ mole ratio | — | — | 1.11 | 1.05 | 1.10 | 1.09 | 1.01 |
| Free H₂O (AOAC) | — | — | 0.80 | 0.20 | 0.30 | 0.17 | 0.20 |
| pH (10% in H₂O) | — | — | 5.2 | 4.2 | 4.9 | 5.0 | 3.9 |
| Crushing strength, lb (−7 + 8 mesh granule) | — | — | 12.1 | 6.3 | 4.6 | 9.6 | 8.0 |
| Sphericity (% round)ᵃ (−6 + 10 mesh product) | — | — | 29 | — | <5 | 28 | <5 |

ᵃTVA Method

EXAMPLE V

A number of tests has been made in the pilot plant to define the variable limits for producing 11-56-0 grade granular ammonium polyphosphate using our invention. Approximately 20 percent of the phosphate was initially present as polyphosphate. At this writing, storage tests are still being made of typical products. A summary of the results of some of these tests follows. The initial moisture content of these products was 0.1 to 0.4 percent water (AOAC vacuum desiccator method).

GENERAL APPEARANCE

The granules were well rounded with no agglomeration of fine particles; individual granules showed layering.

PARTICLE SIZE DISTRIBUTION

The particle size distribution was good. See Table V, test 18 for typical anaylsis.

HARDNESS, BULK DENSITY, AND ABRASION-SHATTER RESISTANCE

The granule hardness of the minus 7- plus 8-mesh fraction was about 10 to 14 pounds. This compares with 5 to 6 pounds for pan granulated urea containing formaldehyde and 6 to 12 pounds for commercial DAP. Loose-pour bulk density was 48.2 pounds per cubic foot and tapped density was about 52.6 pounds per cubic foot. Breakdown in the standard abrasion shatter test was about 0.5 percent, as compared with about 0.7 percent for typical commercial DAP.

APPARENT DENSITY AND ANGLE OF REPOSE

The apparent density of granular ammonium polyphosphate granules was about 1.75 g/cc; the angle of repose was about 40 degrees.

CRITICAL RELATIVE HUMIDITY AND EXPOSURE-PENETRATION CHARACTERISTICS

The critical relative humidity of the granular ammonium polyphosphate was determined to be 65 percent to 75 percent at 86° F. This compares with about 60 percent for ammonium nitrate, about 75 percent for urea, and 55 percent to 60 percent for urea ammonium phosphate of 35-17-0 or 28-28-0 grade. Results of standard laboratory exposure-penetration tests data show the hygroscopic characteristics of granular ammonium polyphosphate to be similar to those of prilled urea and 18-46-0 DAP. Moisture penetrated the bulk material at a rate similar to that of 18-46-0DAP.

BULK-STORAGE TESTS

After several weeks' exposure to ambient warehouse conditions, hydrolysis of polyphosphate to orthophosphate of about 1 percent to 2 percent occurred in product lying within the top 1 inch of the pile and hydrolysis of less than 1 percent occurred in product lying deeper than 1 inch in the pile.

The following tables show the typical formulations for bulk blends and suspensions that can be made with this product.

TYPICAL FORMULATIONS FOR BULK BLENDS

| Ratio | Grade | 46-0-0 | 11-56-0 | 0-0-60 | Filler |
|---|---|---|---|---|---|
| 1:1:0 | 28-28-0 | 978 | 1000 | 0 | 22 |
| 1:1:1 | 19-19-19 | 664 | 679 | 633 | 24 |
| 1:1:2 | 14-14-28 | 489 | 500 | 933 | 78 |
| 1:1:3 | 11-11-33 | 384 | 393 | 1100 | 123 |
| 1:1:4 | 9-9-36 | 314 | 321 | 1200 | 165 |
| 1:1:5 | 8-8-40 | 280 | 286 | 1333 | 101 |
| 1:2:0 | 20-40-0 | 528 | 1429 | 0 | 43 |
| 1:2:1 | 15-30-15 | 396 | 1071 | 500 | 33 |
| 1:2:2 | 12-24-24 | 317 | 857 | 800 | 26 |
| 1:2:3 | 10-20-30 | 264 | 714 | 1000 | 22 |
| 1:2:4 | 8-16-32 | 211 | 571 | 1067 | 151 |
| 1:2:4 | 8-16-32 | 211 | 571 | 1067 | 151 |
| 1:2:5 | 7-14-35 | 185 | 500 | 1167 | 148 |
| 1:2:6 | 6-12-36 | 158 | 429 | 1200 | 213 |
| 1:3:0 | 16-48-0 | 286 | 1714 | 0 | 0 |
| 1:3:1 | 12-36-12 | 214 | 1286 | 400 | 100 |
| 1:3:2 | 10-30-20 | 179 | 1071 | 667 | 83 |
| 1:3:3 | 8-24-24 | 143 | 857 | 800 | 200 |
| 1:3:4 | 7-21-28 | 125 | 750 | 933 | 192 |
| 1:3:5 | 6-18-30 | 107 | 643 | 1000 | 250 |
| 1:3:6 | 6-18-36 | 107 | 643 | 1200 | 50 |
| 1:4:0 | 13-52-1 | 121 | 1857 | 0 | 22 |
| 1:4:1 | 10-40-10 | 93 | 1429 | 333 | 145 |
| 1:4:2 | 9-36-18 | 84 | 1286 | 600 | 30 |
| 1:4:3 | 7-28-21 | 65 | 1000 | 700 | 235 |
| 1:4:4 | 7-28-28 | 65 | 1000 | 933 | 2 |
| 1:4:5 | 6-24-30 | 56 | 857 | 1000 | 87 |
| 1:4:6 | 5-20-30 | 47 | 714 | 1000 | 239 |
| 2:0:1 | 32-0-16 | 1391 | 0 | 533 | 76 |
| 2:0:3 | 20-0-30 | 870 | 0 | 1000 | 130 |
| 2:0:4 | 18-9-36 | 783 | 0 | 1200 | 17 |
| 2:1:0 | 34-17-0 | 1333 | 607 | 0 | 60 |
| 2:1:1 | 26-13-13 | 1019 | 464 | 433 | 84 |
| 2:1:2 | 22-11-22 | 863 | 393 | 733 | 11 |
| 2:3:3 | 18-9-27 | 706 | 321 | 900 | 73 |
| 2:1:4 | 16-9-32 | 627 | 286 | 1067 | 20 |
| 2:2:1 | 22-22-11 | 769 | 786 | 367 | 78 |
| 2:2:3 | 16-16-24 | 559 | 571 | 800 | 70 |
| 2:2:5 | 12-12-30 | 419 | 429 | 1000 | 152 |
| 2:3:0 | 22-33-0 | 675 | 1179 | 0 | 146 |
| 2:3:1 | 18-27-9 | 552 | 964 | 300 | 184 |
| 2:3:2 | 16-24-16 | 491 | 857 | 533 | 119 |
| 2:3:3 | 14-21-21 | 429 | 750 | 700 | 121 |
| 2:3:4 | 12-18-24 | 368 | 643 | 800 | 189 |
| 2:3:5 | 10-15-25 | 307 | 536 | 833 | 324 |
| 2:3:6 | 10-15-30 | 307 | 536 | 1000 | 157 |
| 2:4:1 | 16-32-8 | 422 | 1143 | 267 | 168 |
| 2:4:3 | 12-24-18 | 317 | 857 | 600 | 226 |
| 2:4:5 | 10-20-25 | 264 | 714 | 833 | 189 |
| 3:0:1 | 36-0-12 | 1565 | 0 | 400 | 35 |
| 3:0:2 | 30-0-2 | 1304 | 0 | 667 | 29 |
| 3:0:4 | 21-0-29 | 913 | 0 | 933 | 154 |
| 3:1:0 | 36-12-0 | 1463 | 429 | 0 | 108 |
| 3:1:1 | 30-10-10 | 1219 | 357 | 333 | 91 |
| 3:1:2 | 24-8-16 | 975 | 286 | 533 | 206 |
| 3:1:3 | 21-7-21 | 853 | 250 | 700 | 197 |
| 3:1:4 | 18-6-24 | 731 | 214 | 800 | 255 |
| 3:2:0 | 30-20-0 | 1134 | 714 | 0 | 152 |
| 3:2:1 | 27-18-9 | 1020 | 643 | 300 | 37 |
| 3:2:2 | 21-14-14 | 793 | 500 | 467 | 240 |
| 3:2:3 | 21-14-21 | 793 | 500 | 700 | 7 |
| 3:2:4 | 18-12-24 | 680 | 429 | 800 | 91 |
| 3:2:5 | 15-10-25 | 567 | 357 | 833 | 243 |
| 3:3:1 | 24-24-8 | 839 | 857 | 267 | 37 |
| 3:3:2 | 21-21-14 | 734 | 750 | 467 | 49 |
| 3:3:4 | 15-15-20 | 524 | 536 | 667 | 273 |
| 3:3:5 | 15-15-25 | 524 | 536 | 833 | 107 |
| 3:4:1 | 21-28-7 | 674 | 1000 | 233 | 93 |
| 3:4:2 | 18-24-12 | 578 | 857 | 400 | 165 |
| 4:1:0 | 36-9-0 | 1488 | 321 | 0 | 191 |
| 4:1:1 | 32-8-8 | 1323 | 286 | 267 | 124 |
| 4:1:2 | 28-7-14 | 1158 | 250 | 467 | 125 |
| 4:1:3 | 24-6-18 | 992 | 214 | 600 | 194 |
| 4:1:4 | 20-5-20 | 827 | 179 | 667 | 327 |
| 4:2:1 | 28-14-7 | 1098 | 500 | 233 | 169 |
| 4:2:3 | 24-12-18 | 941 | 429 | 600 | 30 |
| 4:3:0 | 28-21-0 | 1038 | 750 | 0 | 212 |
| 4:3:1 | 24-18-6 | 890 | 643 | 200 | 267 |
| 4:3:2 | 24-18-12 | 890 | 643 | 400 | 67 |
| 4:3:3 | 20-15-15 | 741 | 536 | 500 | 223 |
| 4:3:4 | 20-15-20 | 741 | 536 | 667 | 56 |
| 4:4:1 | 24-24-6 | 839 | 857 | 200 | 104 |
| 4:4:3 | 20-20-15 | 699 | 714 | 500 | 87 |
| 4:5:0 | 24-30-0 | 787 | 1071 | 0 | 142 |
| 4:5:1 | 20-25-5 | 656 | 893 | 167 | 284 |
| 4:5:2 | 20-25-10 | 656 | 893 | 333 | 118 |
| 4:5:3 | 16-20-12 | 525 | 714 | 400 | 361 |
| 4:5:4 | 16-20-16 | 525 | 714 | 533 | 228 |
| 5:1:0 | 40-8-0 | 1671 | 287 | 0 | 42 |
| 5:1:1 | 35-7-7 | 1462 | 250 | 233 | 55 |
| 5:1:2 | 30-6-12 | 1253 | 214 | 400 | 133 |
| 5:1:3 | 25-5-15 | 1044 | 179 | 500 | 277 |
| 5:1:4 | 25-5-20 | 1044 | 179 | 667 | 110 |
| 5:1:5 | 20-4-20 | 835 | 143 | 667 | 355 |
| 5:2:0 | 35-14-0 | 1402 | 500 | 0 | 98 |
| 5:2:1 | 30-12-6 | 1202 | 429 | 200 | 169 |
| 5:2:3 | 25-10-15 | 1002 | 357 | 500 | 141 |
| 5:2:4 | 20-8-16 | 801 | 286 | 533 | 380 |
| 5:2:5 | 20-8-20 | 801 | 286 | 667 | 246 |
| 5:3:0 | 30-18-0 | 1151 | 643 | 0 | 206 |
| 5:3:1 | 30-18-6 | 1151 | 643 | 200 | 6 |
| 5:3:2 | 25-15-10 | 959 | 536 | 333 | 172 |
| 5:3:3 | 25-15-15 | 959 | 536 | 500 | 5 |
| 5:3:4 | 20-12-16 | 767 | 429 | 533 | 271 |
| 5:3:5 | 20-12-20 | 767 | 429 | 667 | 137 |
| 5:4:0 | 30-24-0 | 1099 | 857 | 0 | 44 |
| 5:4:1 | 25-20-5 | 916 | 714 | 167 | 203 |
| 5:4:2 | 25-20-10 | 916 | 714 | 333 | 37 |
| 5:4:3 | 20-16-12 | 733 | 571 | 400 | 296 |
| 5:4:4 | 20-16-16 | 733 | 571 | 533 | 163 |
| 5:4:5 | 20-16-20 | 733 | 571 | 667 | 29 |
| 5:5:1 | 25-25-5 | 873 | 893 | 167 | 67 |
| 5:5:2 | 20-20-8 | 699 | 714 | 267 | 320 |
| 5:5:3 | 20-20-12 | 699 | 714 | 400 | 187 |
| 5:5:4 | 20-20-16 | 699 | 714 | 533 | 54 |
| 6:1:0 | 36-6-0 | 1514 | 214 | 0 | 272 |
| 6:1:1 | 36-6-6 | 1514 | 214 | 200 | 72 |
| 6:1:2 | 30-5-10 | 1262 | 179 | 333 | 226 |
| 6:1:3 | 30-5-15 | 1262 | 179 | 500 | 59 |
| 6:1:4 | 24-4-16 | 1009 | 143 | 533 | 315 |
| 6:1:5 | 24-4-20 | 1009 | 143 | 667 | 181 |
| 6:1:6 | 24-4-24 | 1009 | 143 | 800 | 48 |
| 6:2:1 | 30-10-5 | 1219 | 357 | 167 | 257 |
| 6:2:3 | 24-8-12 | 975 | 286 | 400 | 339 |
| 6:2:5 | 24-8-20 | 975 | 286 | 667 | 72 |
| 6:3:1 | 30-15-5 | 1176 | 536 | 167 | 121 |
| 6:3:2 | 24-12-8 | 941 | 429 | 267 | 363 |
| 6:3:4 | 24-12-16 | 941 | 429 | 533 | 97 |
| 6:3:5 | 18-9-15 | 706 | 321 | 500 | 473 |
| 6:4:1 | 24-16-4 | 907 | 571 | 133 | 389 |
| 6:4:3 | 24-16-12 | 907 | 571 | 400 | 122 |
| 6:4:5 | 18-12-15 | 680 | 429 | 500 | 391 |

SUSPENSION FORMULATIONS WITH GRANULAR APP (11-56-0)

| Ratio | Grade | 11-56-0 | Ammonia | UAN (28-0-0) | Chloride | Water | Clay |
|---|---|---|---|---|---|---|---|
| 1:1:0 | 18-18-0 | 643 | 59 | 861 | 0 | 417 | 20 |
| 1:2:0 | 13-26-0 | 929 | 85 | 315 | 0 | 651 | 20 |
| 1:3:0 | 10-30-0 | 1071 | 98 | 6 | 0 | 805 | 20 |
| 1:1:1 | 14-14-14 | 500 | 46 | 670 | 452 | 312 | 20 |
| 1:2:1 | 11-22-11 | 786 | 72 | 267 | 355 | 500 | 20 |
| 1:3:1 | 9-27-9 | 964 | 88 | 6 | 290 | 632 | 20 |
| 1:1:2 | 11-11-22 | 393 | 36 | 526 | 710 | 315 | 20 |
| 1:2:2 | 8-16-16 | 571 | 52 | 194 | 516 | 647 | 20 |

-continued

SUSPENSION FORMULATIONS
WITH GRANULAR APP (11-56-0)

| Ratio | Grade | 11-56-0 | Ammonia | UAN (28-0-0) | Chloride | Water | Clay |
|---|---|---|---|---|---|---|---|
| 1:3:2 | 7-21-14 | 750 | 68 | 4 | 452 | 706 | 20 |
| 1:1:3 | 8-8-24 | 286 | 26 | 383 | 774 | 511 | 20 |
| 1:2:3 | 7-14-21 | 500 | 46 | 170 | 677 | 587 | 20 |
| 1:3:3 | 6-18-18 | 643 | 59 | 4 | 581 | 693 | 20 |
| 2:1:0 | 22-11-0 | 393 | 36 | 1321 | 0 | 239 | 20 |
| 2:1:1 | 18-9-9 | 321 | 29 | 1073 | 290 | 267 | 20 |
| 2:2:1 | 16-16-8 | 571 | 52 | 765 | 259 | 333 | 20 |
| 2:3:1 | 12-18-6 | 643 | 59 | 432 | 194 | 652 | 20 |
| 2:4:1 | 12-24-6 | 857 | 78 | 291 | 194 | 560 | 20 |
| 2:1:2 | 16-8-16 | 286 | 26 | 954 | 516 | 198 | 20 |
| 2:3:2 | 12-18-12 | 643 | 59 | 432 | 387 | 459 | 20 |
| 2:1:3 | 14-7-21 | 250 | 23 | 835 | 677 | 195 | 20 |
| 2:2:3 | 12-12-18 | 429 | 39 | 574 | 581 | 357 | 20 |
| 2:3:3 | 10-15-15 | 536 | 49 | 360 | 484 | 551 | 20 |
| 3:1:0 | 21-4-0 | 250 | 23 | 1335 | 0 | 372 | 20 |
| 3:2:0 | 18-12-0 | 429 | 39 | 1003 | 0 | 509 | 20 |
| 3:1:1 | 21-7-7 | 250 | 23 | 1335 | 226 | 146 | 20 |
| 3:2:1 | 18-12-6 | 429 | 39 | 1003 | 194 | 315 | 20 |
| 3:3:1 | 15-15-5 | 536 | 49 | 717 | 161 | 517 | 20 |
| 3:4:1 | 15-20-5 | 714 | 65 | 599 | 161 | 441 | 20 |
| 3:1:2 | 18-6-12 | 214 | 20 | 1144 | 387 | 215 | 20 |
| 3:2:2 | 15-10-10 | 357 | 33 | 835 | 323 | 432 | 20 |
| 3:3:2 | 15-15-10 | 536 | 49 | 717 | 323 | 355 | 20 |
| 3:1:3 | 15-5-15 | 179 | 16 | 953 | 484 | 348 | 20 |
| 3:2:3 | 15-10-15 | 357 | 33 | 835 | 484 | 271 | 20 |
| 4:1:0 | 24-6-0 | 214 | 20 | 1573 | 0 | 173 | 20 |
| 4:1:1 | 20-5-5 | 179 | 16 | 1311 | 161 | 313 | 20 |
| 4:2:1 | 20-10-5 | 357 | 33 | 1193 | 161 | 236 | 20 |
| 4:3:1 | 16-12-4 | 429 | 39 | 860 | 129 | 523 | 20 |
| 4:4:1 | 16-16-4 | 571 | 52 | 765 | 129 | 463 | 20 |
| 4:1:2 | 20-5-10 | 179 | 16 | 1311 | 323 | 151 | 20 |
| 4:3:2 | 16-12-8 | 429 | 39 | 860 | 258 | 394 | 20 |
| 4:1:3 | 16-4-12 | 143 | 13 | 1048 | 387 | 389 | 20 |
| 4:2:3 | 16-8-12 | 286 | 26 | 954 | 387 | 327 | 20 |
| 4:3:3 | 16-12-12 | 429 | 39 | 860 | 387 | 265 | 20 |
| 4:4:3 | 12-12-9 | 429 | 39 | 574 | 290 | 648 | 20 |
| 4:3:4 | 12-9-12 | 321 | 29 | 645 | 387 | 598 | 20 |

INVENTION PARAMETERS

The gist underlying the concept of the instant invention is our discovery of operating parameters which allow for a process wherein there is essentially no degradation in the amount of $P_2O_5$ values produced as polyphosphate from the melt stage to the stage of product recovery, i.e., we have discovered the parameters essential for operating our new process wherein essentially no hydrolysis of the polyphosphate $P_2O_5$ values occurs.

Figure 4:
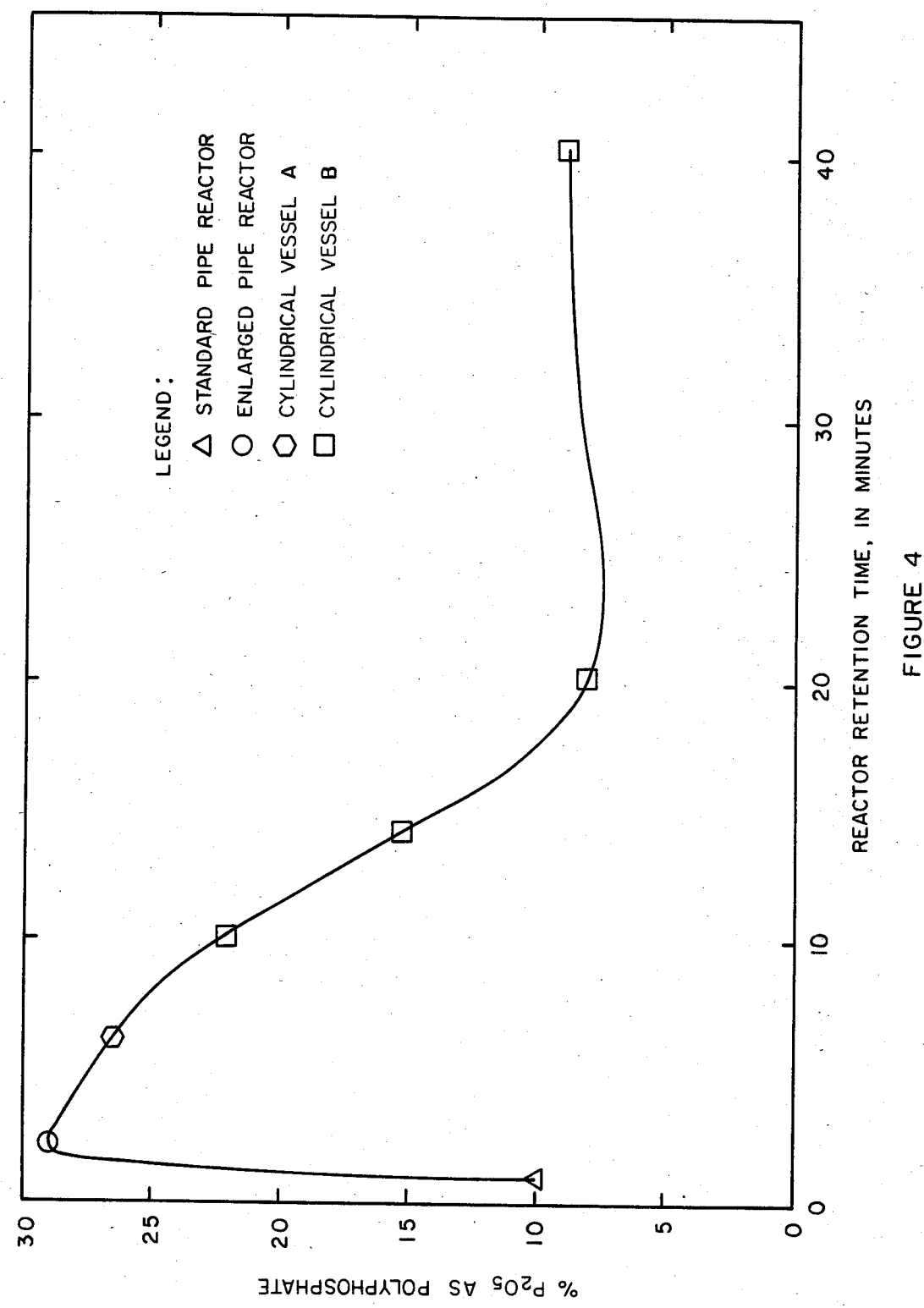
FIG. 4 is a graph illustrating results of various size vessels where phosphoric acid was ammoniated under pressure to show optimum vessel with reactor throughputs of 15 to 350 lb. $P_2O_5/hr \cdot in^2$ internal pipe area and/or 1 to 5 lb. $P_2O_5/hr \cdot in^3$ internal pipe volume to obtain maximum polyphosphate $P_2O_5$ as illustrated below.

From a review of the prior art teachings and the experiences of those skilled therein together with the depictions of FIG. 4, it would appear that the three main factors which can and do contribute to such hydrolysis degradation of polyphosphate are time at temperature, maximum operating temperature, and water entrapment and/or disengagement in/from the melt. A comparison of the operating parameters of the instant invention with those of Norton and Parker supra, U.S. Pat. No. 4,134,750, examples 1 and 2, columns 7-9, shows that we normally operate with about the same temperatures and times as they do. Accordingly, since under these conditions, we still do not experience any appreciable amounts of hydrolyzation; we can only conclude that what makes our invention work is our control of the third factor, to wit, water entrapment or disengagement.

The concept of water disengagement from polyphosphate melts is definitely not a new concept, nor for that matter a newly unveiled problem. See, for instance, U.S. Pat. No. 3,733,191, Meline et al, wherein this problem was addressed through the expedient of construction and operation of a rather complicated piece of equipment, to wit, the foam disengager vessel as described therein in FIGS. 4 and 5 and also described in column 11, line 42, through column 12, line 42; and column 13, line 46 through column 14, line 44. Obviously, in the operation of the instant invention, we are not proposing the use of such a mechanical monstrosity but have unexpectedly discovered a set of operating parameters wherein the desired objectives thereof are realized, i.e., the position of the enlarged pressured spraying system in the rotating drum in relationship to the spray therefrom onto the falling curtain has proven to be highly critical. See Example IV, Table V.

We believe that this arrangement effectively disengages substantial quantities of both chemical and free water from the melt as it travels to and coats the particles in or from the falling curtain to thereby effect attainment of the principal objectives of the instant invention.

After sifting and winnowing through the data supra, as well as other results of tests and operation of our new, novel, and improved method for production of ammonium polyphosphate fertilizers having enhanced characteristics herein described, we now present the operating and preferred ranges for variables shown below.

| Variable | Operating Range | Preferred Range |
|---|---|---|
| $H_3PO_4$ feed temperature | | |
| To pipe reactor), °F. | 50-210 | 80-200 |
| $NH_3$ feed temperature, °F. | 50-200 | 75-190 |
| Enlarged pipe reactor | | |
| Temperature, °F. | 400-550 | 420-520 |
| Pressure, psig | 10-100 | 40-55 |
| Throughput | | |
| lb $P_2O_5$/hr · in² | 15-350 | 50-325 |
| lb $P_2O_5$/hr · in³ | 1-5 | 1.5-4 |
| Distance from falling curtain | 1-20 | 6-8 |
| Granulator | | |
| RPM | 5-25 | 10-15 |
| Temperature, °F. | 90-250 | 130-200 |
| Air flow | | |
| CFM/ton product | 100-800 | 300-500 |
| Velocity, ft/sec | 1-10 | 3-6 |
| Recycle, lb/lb melt | 0.5-10 | 1-4 |
| Retention time, mins | 3-25 | 5-20 |
| Number of pans | 1-4 | 1-3 |
| Number of flights/ft² cross sectional area | 2.5-15 | 5-10 |
| Cooler | | |
| RPM | 5-25 | 8-12 |
| Temperature | 80-125 | 90-120 |
| Airflow | | |
| CFM/ton product | 500-1500 | 600-1000 |
| Velocity, ft/sec | 1-8 | 2-7 |
| Polyphosphate $P_2O_5$ | | |
| Percent of total $P_2O_5$ | 0-35 | 12-30 |

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters Patent of the United States is:

1. An improved process for preparing granular substantially dust-free ammonium polyphosphate of a particle size distribution eminently suitable for subsequent bulk blending with other fertilizer values or eminently suitable for use in production of liquid or suspension fertilizers, which process consists essentially of the steps of:
   (a) simultaneously supplying a stream of anhydrous ammonia to the common pipe section of an enlarged pressurized pipe reactor;
   (b) simultaneously supplying a stream of phosphoric acid to the cross section of said pipe-cross reactor, said phosphoric acid having a $P_2O_5$ content in the range from about 50 percent to about 58 percent by weight and a free water content ranging from about 10 percent to 22 percent by weight;
   (c) contacting said anhydrous ammonia introduced into said common pipe section of said enlarged pressurized pipe reactor at said cross section of said enlarged pressurized pipe reactor therewith, at a temperature sufficiently high so that additional water is not necessary for continuous operation;
   (d) subsequently introducing the reaction product resulting from contacting said anhydrous ammonia and phosphoric acid into a vapor tube extension of said enlarged pressurized pipe reactor to ensure continued intimate contact therebetween;
   (e) subsequently discharging from the downstream end of said vapor tube extension a spray of particles of molten material into the upper end of arm inclined rotating drum wherein is maintained a bed of rolling discrete particles of ammonium polyphosphate and on to the rapidly moving granules of substrate maintained therein such that the granules of substrate or seed recycle are increased in size by accretion as the sprayed particles solidify quickly onto the surfaces of said substrate; withdrawing the resulting ammonium polyphosphate material from the lower end of said inclined rotating drum;
   (f) introducing said withdrawn material into cooling means;
   (g) withdrawing the resulting cooled material from said cooling means;
   (h) introducing said material withdrawn from said cooling means into sizing means;
   (i) returning particles of pedetermined size from said sizing means into the upper end of said drum; and
   (j) withdrawing from said sizing means granular particles of ammonium polyphosphate as product;
   said process characterized by the fact that the proportion of the $P_2O_5$ as polyphosphate, of the granular product withdrawn from step (j) supra is substantially equal to the proportion of the $P_2O_5$ as polyphosphate of the melt exiting said vapor tube extention of said pipe reactor in step (d) supra; and said process being further characterized by the fact that the weight percent $P_2O_5$ withdrawn from step (j) supra is substantially equal to the weight percent $P_2O_5$ in the melt exiting said vapor tube extension in step (d) supra.

2. The process of claim 1 wherein the $NH_3:H_3PO_4$ mole ratio of the reaction product from said enlarged pressurized pipe reactor is maintained at about 1, thereby effecting production of an ammonium polyphosphate containing up to about 30 percent of its $P_2O_5$ as polyphosphate.

3. The process of claim 2 wherein said inclined rotating drum is equipped with lifting flights.

4. The process of claim 3 wherein said inclined rotating drum equipped with lifting flights is further equipped with deflector means, said deflector means positioned within the confines of said drum and being of length substantially equal to the length of said drum and in a plane substantially paralleled with the axis of said drum, and a substantial portion of said plane located horizontally above said drum axis.

* * * * *